United States Patent [19]

Schmid

[11] Patent Number: 5,046,471

[45] Date of Patent: Sep. 10, 1991

[54] ARRANGEMENT FOR FEEDING OF FUEL FROM SUPPLY TANK TO INTERNAL COMBUSTION ENGINE OF POWER VEHICLE

[75] Inventor: Werner Schmid, Tamm, Fed. Rep. of Germany

[73] Assignee: Robert Bosch GmbH, Stuttgart, Fed. Rep. of Germany

[21] Appl. No.: 497,396

[22] Filed: Mar. 22, 1990

[30] Foreign Application Priority Data

Apr. 28, 1989 [DE] Fed. Rep. of Germany ....... 3914081

[51] Int. Cl.⁵ .......................................... F02M 37/10
[52] U.S. Cl. .................................. 123/509; 123/510; 517/363
[58] Field of Search ............... 123/509, 510, 514, 516; 417/363

[56] References Cited

U.S. PATENT DOCUMENTS

| 3,659,965 | 5/1972 | Ebert | 417/363 |
| 4,362,476 | 12/1982 | Kemmner | 417/363 |
| 4,776,315 | 10/1988 | Greiner | 123/509 |
| 4,865,522 | 9/1989 | Radermacher | 417/363 |
| 4,869,225 | 9/1989 | Nagata | 123/509 |
| 4,878,816 | 11/1989 | Tuckey | 123/510 |
| 4,971,017 | 11/1990 | Beakley | 123/510 |

FOREIGN PATENT DOCUMENTS

| 181282 | 3/1955 | Austria | 417/363 |
| 2844053 | 4/1980 | Fed. Rep. of Germany | 123/509 |
| 3602135 | 5/1987 | Fed. Rep. of Germany | |
| 2007115 | 1/1970 | France | 417/363 |

Primary Examiner—Carl Stuart Miller
Assistant Examiner—Erick Solis
Attorney, Agent, or Firm—Michael J. Striker

[57] ABSTRACT

An arrangement for feeding of fuel to an internal combustion engine of a power vehicle comprises a supply tank having a tank bottom, a feeding aggregate arranged in the supply tank, a receiving part holding the feeding aggregate, a holder mounted on the tank bottom, and vibration damping unit through which the receiving part is connected with the holding ring, the vibration damping unit including a metal spring and a rubber elastic buffer through which the metal spring is mounted on at least one of the receiving part and the holder.

9 Claims, 1 Drawing Sheet

ARRANGEMENT FOR FEEDING OF FUEL FROM SUPPLY TANK TO INTERNAL COMBUSTION ENGINE OF POWER VEHICLE

BACKGROUND OF THE INVENTION

The present invention relates to an arrangement for feeding fuel from a supply tank to an internal combustion engine of a power vehicle.

Arrangements of the above mentioned general type are known in the art. One of such arrangements is disclosed for example in the German document DE-PS 3, 602, 135. In this arrangement a receiving part for the feeding aggregate is supported on a holder of the tank bottom through a vibrations damping means which include a plurality of elastic webs. The webs extend tangentially to the axis of the roll-shaped aggregate and their ends are connected with the feeding aggregate receiving part on the one hand and with the tank bottom holder on the other hand. The thusly formed and arranged damping means are, however, incapable of dampening the low frequencies. Therefore, such frequencies reach the tank bottom undampened, and the tank bottom acts as a resonance body producing undesirable noise.

SUMMARY OF THE INVENTION

It is therefore an object of the present invention to provide an arrangement for feeding fuel from a supply tank to an internal combustion engine of a power vehicle which avoids the disadvantages of the prior art.

In keeping with these objects and with others which will become apparent hereafter, one feature of the present invention resides, briefly stated, in an arrangement for feeding of fuel to an internal combustion engine of a power vehicle, which comprises a supply tank having a tank bottom, a feeding aggregate arranged in said supply tank, a receiving part holding said feeding aggregate, a holder mounted on said tank bottom, and vibration damping means through which said receiving part is connected with said holder, said vibration damping means including a metal spring and a rubber elastic buffer through which said metal spring is mounted on at least one of said receiving part and said holder.

When the arrangement is designed in accordance with the present invention, the vibration damping means has two different operating dampers which efficiently dampen both the high frequencies by the buffer, and the low frequencies by the metal spring, so that the undesirable body sounds are prevented.

Still another feature of the invention is that the cup has a cup wall and the bowl has a bowl wall, the one end of the metal spring being connected with the cup wall and the other end of the metal spring being connected with the bowl wall.

The metal spring can be formed as a spiral spring. The spiral spring has an inner end held on said receiving part and an outer end connected with said holder. The receiving part can be cup-shaped and has a cup wall provided with a radial projection, and the spiral spring is fixed on an outer surface of said cup wall. The buffer can be hat shaped and arranged on said projection, and the spiral spring can have an inner winding surrounding said buffer. The holder can have a recess, and the outer end of said spiral spring engages in said recess and is fixed in it. The projection of the receiving part and the radial projection of the holder can form means for limiting of vibrations of the receiving part relative to the holder.

In accordance with another feature, said receiving part is cup-shaped and has a cup in which said feeding aggregate is arranged, the said holder is bowl-shaped and having a bowl bottom connected to the tank bottom, and the metal spring having one end connected with the cup and another end connected with the bowl.

The novel features of the present invention are set forth in particular in the appended claims. The invention itself however both as to its construction and its manner of operation can be best understood from the following description of preferred embodiments which is accompanied by the following drawings.

DESCRIPTION OF A PREFERRED EMBODIMENT

Figure 1:
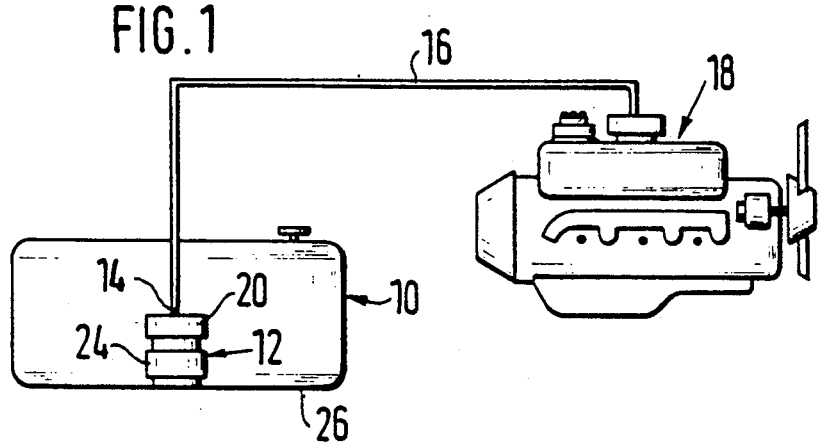
FIG. 1 is a schematic view showing an arrangement for feeding fuel for a power vehicle.

FIG. 1 shows a fuel supply tank 10, in which a fuel feeding unit 12 is arranged. A pressure conduit 16 is connected with a pressure pipe 14 of the fuel feeding unit 12 and leads to an internal combustion engine 18. During the operation of the internal combustion engine the fuel feeding unit 12 supplies the fuel from the supply tank 10 to the internal combustion engine 18.

Figure 2:
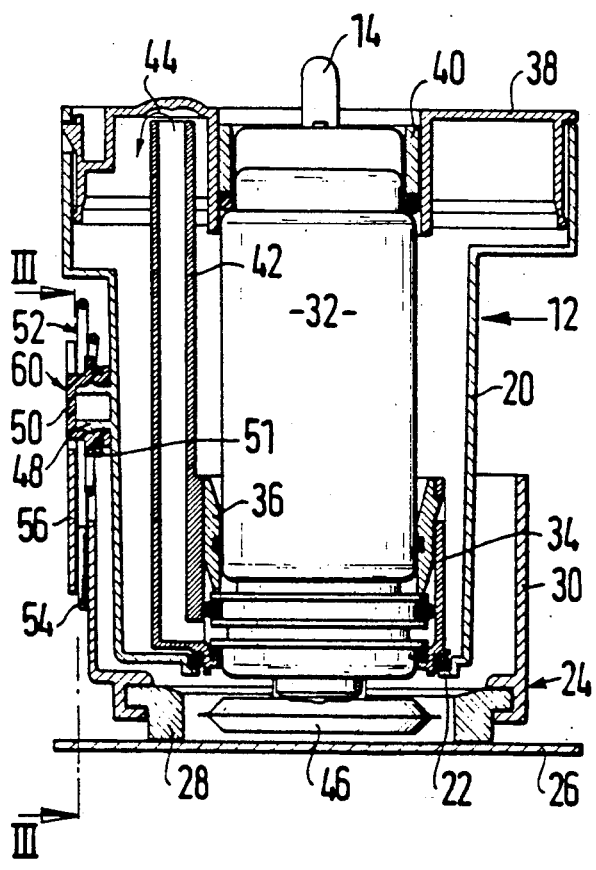
FIG. 2 is a view showing a section of the feeding arrangement in accordance with the present invention through a feeding unit of FIG. 1, taken along the line II—II in FIG. 3.
Figure 3:
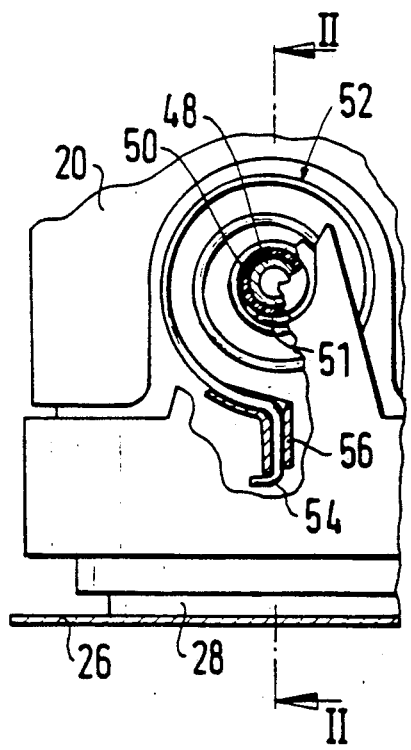
FIG. 3 is a view showing a partial section through the feeding unit of FIG. 2 along the line III—III.

As can be seen specifically from FIG. 2, a fuel feeding aggregate of the fuel feeding unit 12 is roller shaped and sits in a cup-shaped receiving part 20. The receiving part 20 is inserted in its lower region provided with a cup bottom 22, in a bowl-shaped holder 24. The bowl-shaped holder 24 is fixedly connected with the bottom 26 of the fuel supply tank 10. For this purpose, the holder 24 has a mounting ring 28 which is for example welded with the tank bottom 26. The wall of the bowl-shaped holder 24 in turn is connected by a plug-rotary connection which is known as a bayonet connection, with the mounting ring 28.

The fuel feeding aggregate 32 is supported in the receiving part 20 in its lower region through a centering sleeve 34 and a filling ring 36. In its upper region the fuel feeding aggregate 32 is centered in the cup-shaped receiving part 20 by a centering ring 38 and a compensating ring 40. A substantially vertical rising pipe 42 is formed on the centering sleeve 34. The medium supplied from a first pump stage of the feeding aggregate 32 is pumped through the rising pipe 42 in direction of the arrow 44 to the cup-shaped receiving part 20. From there, it is aspirated by a pressure stage of the feeding aggregate 32 and supplied through the pressure pipe 14 to the pressure and feeding conduit 16 and to the internal combustion engine 18.

The fuel feeding unit 12 includes, in addition to the fuel feeding aggregate 32, the receiving part 20 and the holder 24. The feeding aggregate 32 has a suction filter 46 extending in the opening of the mounting ring 28. The mounting ring 28 has throughgoing openings not shown, so that the fuel to be fed can flow from the supply tank 10 to the suction filter 46.

The connection between the receiving part 20 and the holder 24 is performed by the following structure. The cup-shaped receiving part 20 has a radial projection 48 provided on its outer surface and shown in FIG. 2. A rubber elastic buffer 50 is arranged on the projection 48. The rubber elastic buffer 50 is hat shaped. An inner winding 51 of a spiral spring 52 engages with the projection 48 or the buffer 50. Several windings of the spiral spring 52 surround the projection 48 of the cup-shaped receiving part 20. The outer free end 54 of the spiral spring 52 is fixed to the bowl-shaped holder 24. For this purpose, the outer end 54 which is curved substantially in radial direction of the spiral spring 52, engages in a groove-shaped recess of the holder 24 arranged on a radial projection 56 of the holder. Thereby, a supporting connection between the holder 24 and receiving part 20 is produced. Since the above arrangement on the periphery of the holder 24 and the receiving part 20 in this example is provided in triplicate, a secure supporting connection is obtained.

The spiral spring 52 made of metal, preferably spring steel is especially suitable to dampen low frequencies generated from the feeding aggregate 32. The hat-shaped rubber buffer 50 in contrast absorbs preferably the high frequencies of the feeding aggregate 32. These two dampers which operate counter to one another form therefore a reliable vibration damping means 60 which efficiently dampen the frequencies within a broad spectrum.

A further special feature of the present invention is that the projection 48 of the receiving part 20 and the radial projection 56 of the holder 24 are arranged relative to one another so that the projection 56 forms an abutment cooperating with the projection 48 or with the surrounding spring convolutions to provide a limit. It must absorb the vertical movements of the receiving part 20 relative to the holder 24, before the suction filter 46 abuts against the tank bottom 26.

What is important is that the feeding device has vibration damping means 60 including a metal spring 52 and a rubber elastic buffer. It is recommended that both ends 51 and 54 of the spiral spring 52 are supported in the rubber elastic buffers, also when in the respective embodiment the inner winding 51 of the spiral spring 52 is fixed on a rubber buffer 50.

It will be understood that each of the elements described above, or two or more together, may also find a useful application in other types of constructions differing from the types described above.

While the invention has been illustrated and described as embodied in an arrangement for feeding of fuel from a supply tank to an internal combustion engine of a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for feeding of fuel to an internal combustion engine of a power vehicle, comprising a supply tank having a tank bottom; a feeding aggregate arranged in said supply tank; a receiving part holding said feeding aggregate; a holder mounted on said tank bottom; and vibration damping means through which said receiving part is connected with said holder, said vibration damping means including a metal spring and a rubber elastic buffer through which said metal spring is mounted on at least one of said receiving part and said holder, said receiving part being cup-shaped and having a cup in which said feeding aggregate is arranged, said holder being bowl-shaped and having a bowl bottom connected to said tank bottom, said metal spring having one end connected with said cup and another end connected with said bowl.

2. An arrangement as defined in claim 1, wherein said cup has a cup wall and said bowl has a bowl wall, said one end of said metal spring being connected with said cup wall and said other end of said metal spring being connected with said bowl wall.

3. An arrangement as defined in claim 1, wherein said metal spring is formed as a spiral spring.

4. An arrangement as defined in claim 3, wherein said spiral spring has an inner end held on said receiving part and an outer end connected with said holder.

5. An arrangement for feeding of fuel to an internal combustion engine of a power vehicle, comprising a supply tank having a tank bottom; a feeding aggregate arranged in said supply tank; a receiving part holding said feeding aggregate; a holder mounted on said tank bottom; and vibration damping means through which said receiving part is connected with said holder, said vibration damping means including a metal spring and a rubber elastic buffer through which said metal spring is mounted on at least one of said receiving part and said holder, said metal spring being formed as a spiral spring having an inner end held on said receiving part and an outer end connected with said holder, said receiving part being cup-shaped and having a cup wall provided with a radial projection, said spiral spring being fixed on an outer surface of said cup wall.

6. An arrangement as defined in claim 5, wherein said buffer is hat shaped and arranged on said projection, said spiral spring having an inner winding surrounding said buffer.

7. An arrangement as defined in claim 5, wherein said holder has a recess, said outer end of said spiral spring engaging in said recess and being fixed in it.

8. An arrangement as defined in claim 7, wherein said holder has a radial projection, said recess being formed in said radial projection of said holder.

9. An arrangement as defined in claim 8, wherein said projection of said receiving part and said radial projection of said holder forms means for limiting of vibrations of said receiving part relative to said holder.

* * * * *